INVENTOR.
JAMES W. BANKS
BY Porter + Meyer
ATTORNEYS

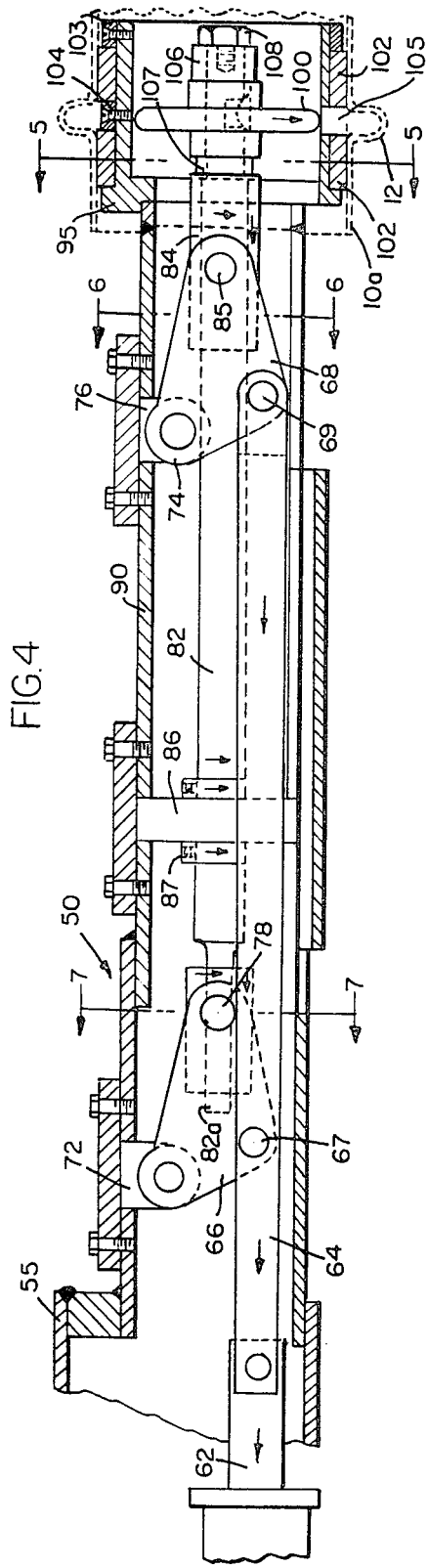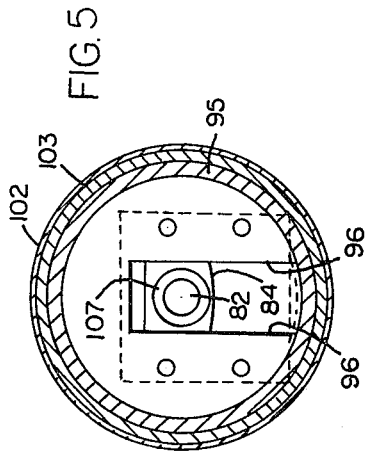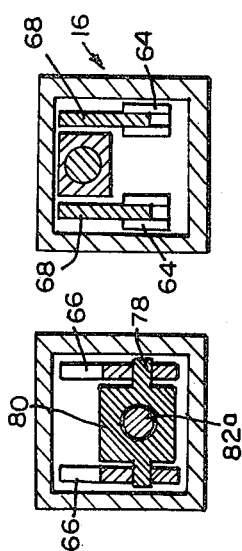

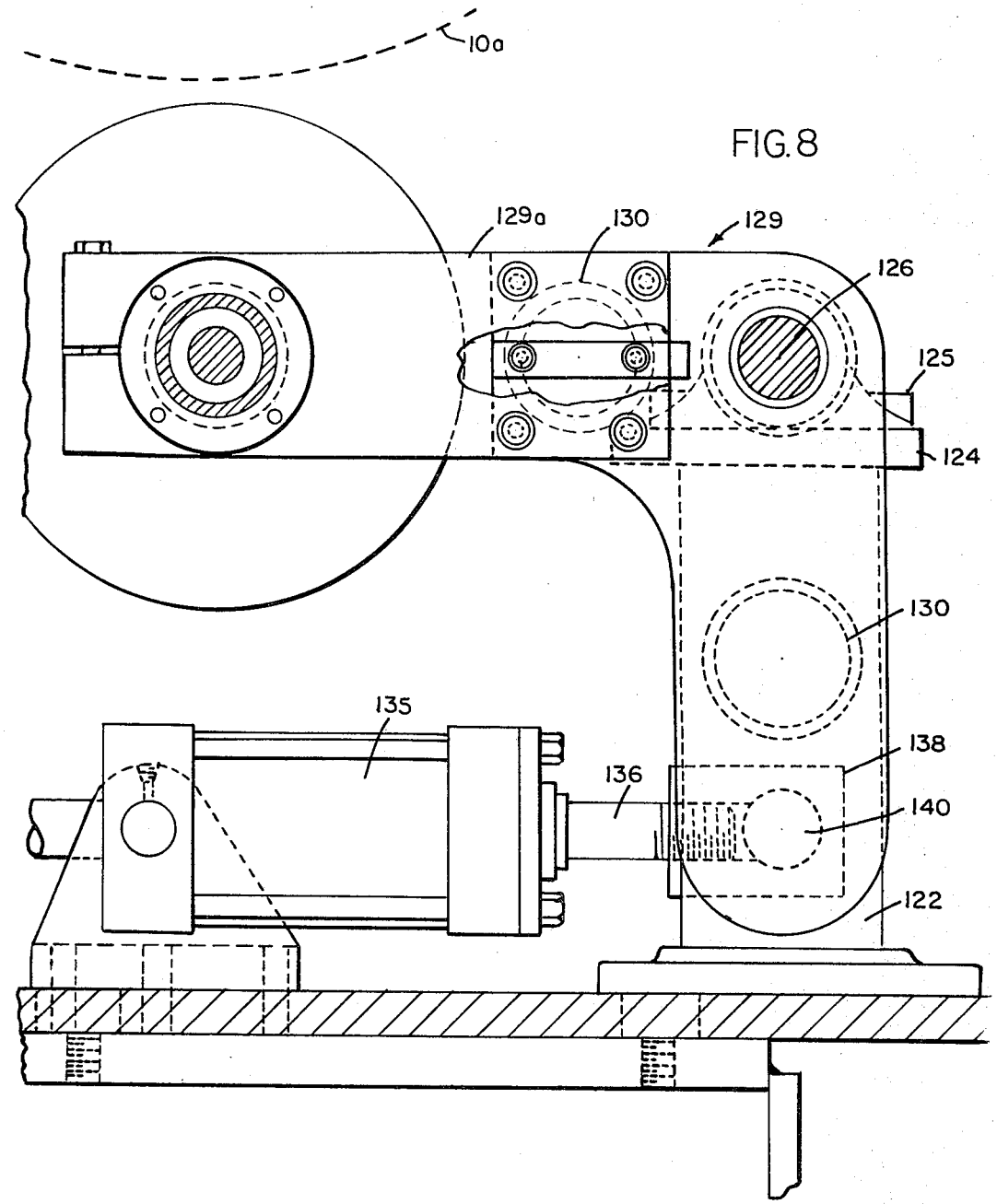

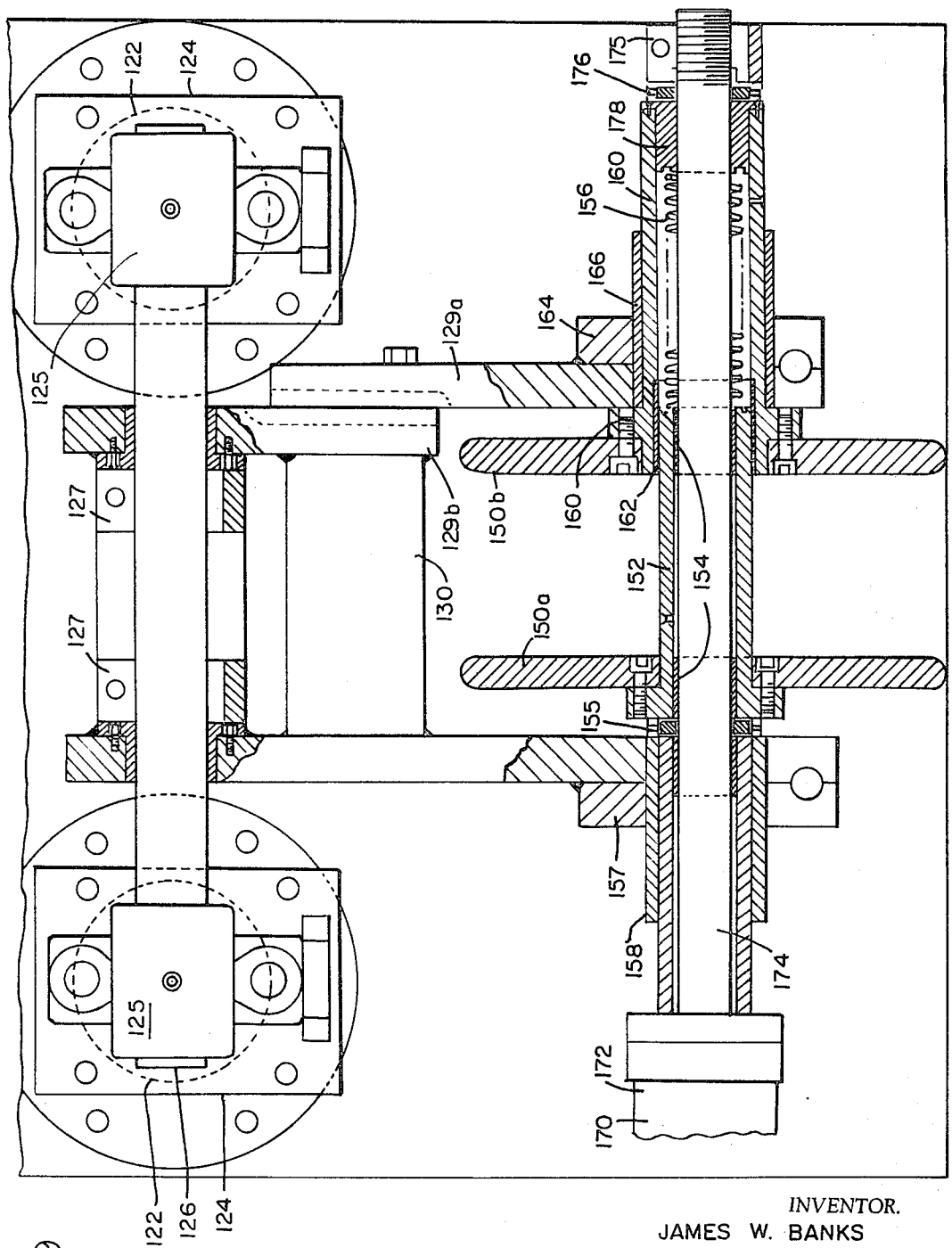

3,429,160
METHOD AND APPARATUS FOR FORMING
METAL BELLOWS EXPANSION JOINTS
James W. Banks, Mount Carmel Road,
Parkton, Md. 21120
Filed Aug. 13, 1965, Ser. No. 495,008
U.S. Cl. 72—77          10 Claims
Int. Cl. B21b *13/20, 19/00;* B21d *51/00*

ABSTRACT OF THE DISCLOSURE

A novel method and apparatus for forming metal bellows expansion joints having successive peripheral convolutions formed therein, including a bed, a rotatable chuck on which a cylindrical work piece is fixedly mounted, a motor for positively driving the rotatable chuck, and a freely rotatable internal forming roll mounted for transverse movement within the forming head. A pair of spaced, freely rotatable external forming rolls are fixedly mounted on the bed of the apparatus, power means for moving the internal forming roll transversely against the inside of the cylindrical work piece, and thereby forcing metal between the spaced external forming rolls to form a peripheral convolution in the work piece, and means for moving the rotatable chuck longitudinally on the bed for forming successive peripheral convolutions in the work piece.

---

Metal bellows expansion joints are widely known and used in industry, being commonly used to provide relief from excessive pressure build-up in gas and liquid pipe lines, ducting or pressure vessel systems of great variety, and to compensate for thermal expansion and contraction. They are used in atomic reactors, missile ducting, power plant piping, and simple hot water heating systems. Such metal bellows expansion joints are commonly formed from cylindrical sectional work pieces of a suitable metal, such as copper, copper-nickel, nickel-copper stainless steel, bronze and the like, and a series of parallel annular convolutions are formed around the periphery of the cylinder by the application of great pressure to the cylinder. When placed in position in a pipeline or pressure system, the convolutions, when subjected to internal pressures and temperatures of the medium being handled, act in the fashion of a coil spring, and expand or contract in compensation for such internal pressures and temperatures, thereby preventing, or resisting distortion, breaking, or mal-functioning of equipment and instruments and resulting damage to property, loss of valuable liquids, or gases, and the loss of human life.

The present method and apparatus is designed for forming metal bellows expansion joints ranging from 3 to 72 inches in diameter, and while these lower and upper limits can be extended, other methods and apparatus may be more efficient and desirable for forming metal bellows expansion joints below and above these limits.

For the past 35 years, and currently some 90% or more of the metal bellows expansion joints have been formed in hydraulic presses wherein a hydraulic ram forces liquid (usually water) under great pressure into the cylindrical work piece held in exterior forming dies, which forces the convolutions outwardly into the dies. This has to be done in two or three separate steps or operations, and the work piece removed and annealed in a furnace between the separate steps to soften the metal. Otherwise the metal becomes too brittle and cracks or breaks under the pressure. This method is extremely slow and costly, there is no control over the yield point in the convolutions, and external reinforcing steel rings are commonly necessary for all pressures over approximately 75 pounds, which alone are very costly, and greatly increase the cost of the expansion joint.

A spin-forming method and apparatus is also currently in use, which accounts for possibly 10% of the metal bellows expansion joints currently manufactured. Here the cylindrical metal work piece is held loosely on a forming head, in which an internal forming roll is positively driven against the work piece, which in turn is driven against a pair of external forming rolls, also positively driven, thus forming convolutions in the cylindrical work piece. The cylindrical work piece rotates freely on the external forming rolls, and itself is not positively driven. By this method and apparatus there is no control over the yield point in the convolutions of the metal bellows, and consequently metal bellows expansion joints made by this method and apparatus can be used only on low pressure lines and vessels, normally under 75 p.s.i., and for use over 75 p.s.i., the costly reinforcing rings are necessary. The two sets of internal and external rolls are both positively driven, and with the cylindrical work piece freely rotating between them, it is difficult or impossible to prevent slippage of the work piece between the two sets of rolls, which means grinding and scratching of the work piece, with consequent weakening of the walls of the convolutions, leaving them very vulnerable to the corrosive action of the liquids and gases with which they may be used.

Briefly, my invention comprises the method of forming cylindrical metal bellows expansion joints having successive peripheral convolutions therein, which includes the step of fixedly mounting a cylindrical work piece on a rotatable chuck, positively driving the rotatable chuck, transversely moving a freely rotatable forming roll internally mounted in a forming head against the inside of the cylindrical work piece, and against a pair of opposing fixedly mounted, freely rotatable external forming rolls, to form peripheral convolutions in said work piece, and moving the chuck longitudinally of said fixed internal and external forming rolls to form successive convolutions in said work piece. In addition, as a separate step, the cylindrical work piece having the successive convolutions formed therein may be additionally rotated between a separate pair of positively-driven, opposed forming rolls to work harden the inner convolutions formed in the work piece, to make the inner and outer convolutions of uniform hardness.

The apparatus devised to perform this method of forming cylindrical metal bellows having successive peripheral convolutions therein, includes a bed, a rotatable chuck on which a cylindrical work piece is fixedly mounted, a motor for positively driving the rotatable chuck, a freely rotatable internal forming roll mounted for transverse movement within the forming head, a pair of spaced, freely rotatable external forming rolls fixedly mounted on the bed of the apparatus, power means for moving the internal forming roll transversely against the inside of the cylindrical work piece, and thereby forcing metal between the spaced external forming rolls to form a peripheral convolution in the work piece, and means for moving the rotatable chuck longitudinally on the bed for forming successive peripheral convolutions in the work piece. In addition, separate apparatus may be provided comprising a separate pair of positively driven, opposed forming rolls to work harden the inner convolutions formed on the work piece, again to make the inner and outer convolutions of a uniform hardness.

Advantages of the invention

The advantages of my method and apparatus are many:
(1) The cost of manufacturing standard metal bellows expansion joints is reduced from 20 to 50%, depending on the diameter of the joint, the metal and the gauge of metal used, and the number and height of the convolutions formed, with the savings in cost of manufacture averaging 30%.

(2) The time required to manufacture a standard metal bellows expansion joint of 24 inch diameter can be reduced from 2 hours by the hydraulic method, to 10 minutes by my method.

(3) The same machine, with two or more forming heads of differing diameter, and sets of internal and external forming rolls of differing diameter can be used to form metal bellows expansion joints from 3 to 72 inches in diameter, and with varying numbers and heights of convolutions, to meet customers' varying engineering specifications.

(4) The yield point of the convolutions, both inner and outer, can be carefully controlled by the work-hardening methods made possible by my method and apparatus, thereby providing uniformity between all parts of the convolutions.

(5) The necessity of adding annular metal reinforcing rings to the convolutions is thus eliminated, a very substantial saving in cost of the expansion joint to the customer.

(6) Two or more expansion joints can be formed successively from one cylindrical work piece, thus reducing forming time.

(7) Because of higher yield points, lighter gauge stainless steel or other alloys can be used, particularly valuable in missiles and airborne appliances, where weight is a factor.

(8) Expansion joints can be formed from much heavier gauge metal than by the hydraulic method, because much more force can be made available for forming the convolutions, since with the internal forming roll freely rotating, space for mechanism for driving the internal roll is not required in the forming head.

(9) Corrosion resistance is greatly improved, because with the work-piece being driven, and the internal and external forming rolls being freely rotated, slippage between the work-piece and the forming rolls is largely eliminated, thereby eliminating structural weaknesses due to scratching and scraping of the work-piece, and hence vulnerability to corrosive action from the medium.

In the drawings:

FIG. 4 is a vertical cross-section of the forming head as viewed from the side as in FIG. 3;

FIG. 5 is a vertical section on line 5—5 of FIG. 4;

FIG. 6 is a vertical section on line 6—6 of FIG. 5;

FIG. 7 is a vertical section on line 7—7 of FIG. 4;

FIG. 8 is a vertical section on line 8—8 of FIG. 3;

FIG. 9 is a plan view of the external forming rolls on lines 9—9 of FIG. 3, with work-piece and forming head omitted.

Figure 1:
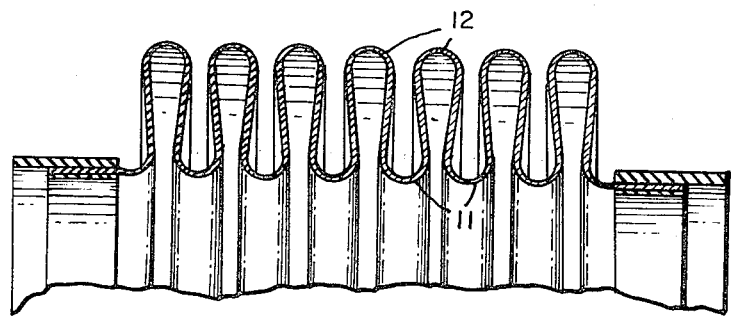
FIG. 1 is a sectional view of a metal bellows expansion joint.
Figure 2:
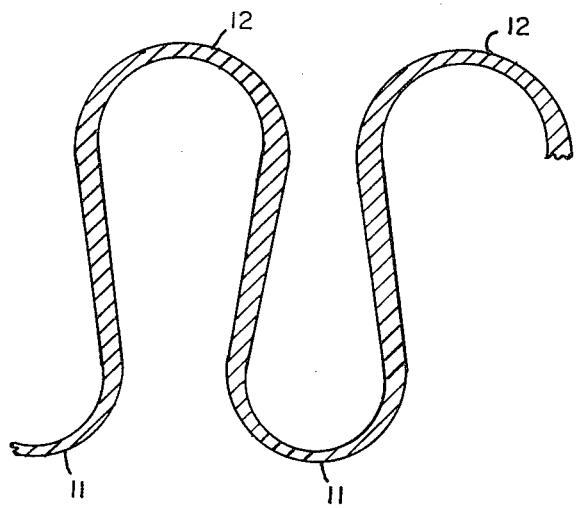
FIG. 2 is an enlarged section showing inner and outer convolutions.

In the drawings (FIG. 1) 10 represents a typical metal bellows expansion joint in its completed form, as formed by the present method and on the present apparatus. FIG. 2 is an enlarged vertical section on line 2—2 of FIG. 1 showing the expansion joint with its inner convolutions 11 and outer convolutions 12.

20 represents the bed or base of the apparatus generally (FIG. 3) which includes a track section 22, with a pair of tracks 24, on which is mounted for longitudinal movement, a trolley 25, with wheels 26. Two vertical posts 28 are mounted on the trolley 25 which support the platform 30, on which are mounted the motor M and speed reducer 32. These are arranged for vertical movement on platform 30, by means of hand crank 34, which in turn, through chain 36 and sprocket 38 and shaft 40, rotates a threaded acme nut on an acme threaded shaft (not shown) to raise and lower platform 30. As these are conventional mechanisms, they are not shown in detail. Mounted on shaft 42 of speed reducer 32 is a modified Cushman chuck 44 with varying diameter jaws for engaging and firmly holding interiorly a cylindrical work piece 10a, of varying diameters. It will be understood that work piece 10a is positively driven and rotated through chuck 44, shaft 42, speed reducer 32 and motor M, whose r.p.m. is controlled and varied by a manual variable transmission, shown at 33. Such variable r.p.m. control is necessary to accommodate varying diameters, metals, and gauges of metal used in varying work pieces 10a. It will be further understood that platform 30 and with it, motor M, speed reducer 32, shaft 42, and chuck 44 are raised and lowered as needed, to locate the center of work piece 10a of varying diameters, as required for proper location of the work piece 10a with relation to forming head 50. Mechanism is provided for moving the trolley 25 forward and back on tracks 24, which includes hand wheel 45, mounted on shaft 46 on which is mounted a conventional sprocket and chain (not shown), with a suitable clamping fixture (not shown) for attaching the chain to the base of the trolley 25. It will be understood that trolley 25 is advanced forwardly (to the left in FIG. 3) to hold the work piece 10a in proper position in relation to the forming rolls (described below) as successive convolutions 12 are formed in the work piece 10a. It is contemplated that the indexing of this mechanism may be automated, if desired.

Figure 3:
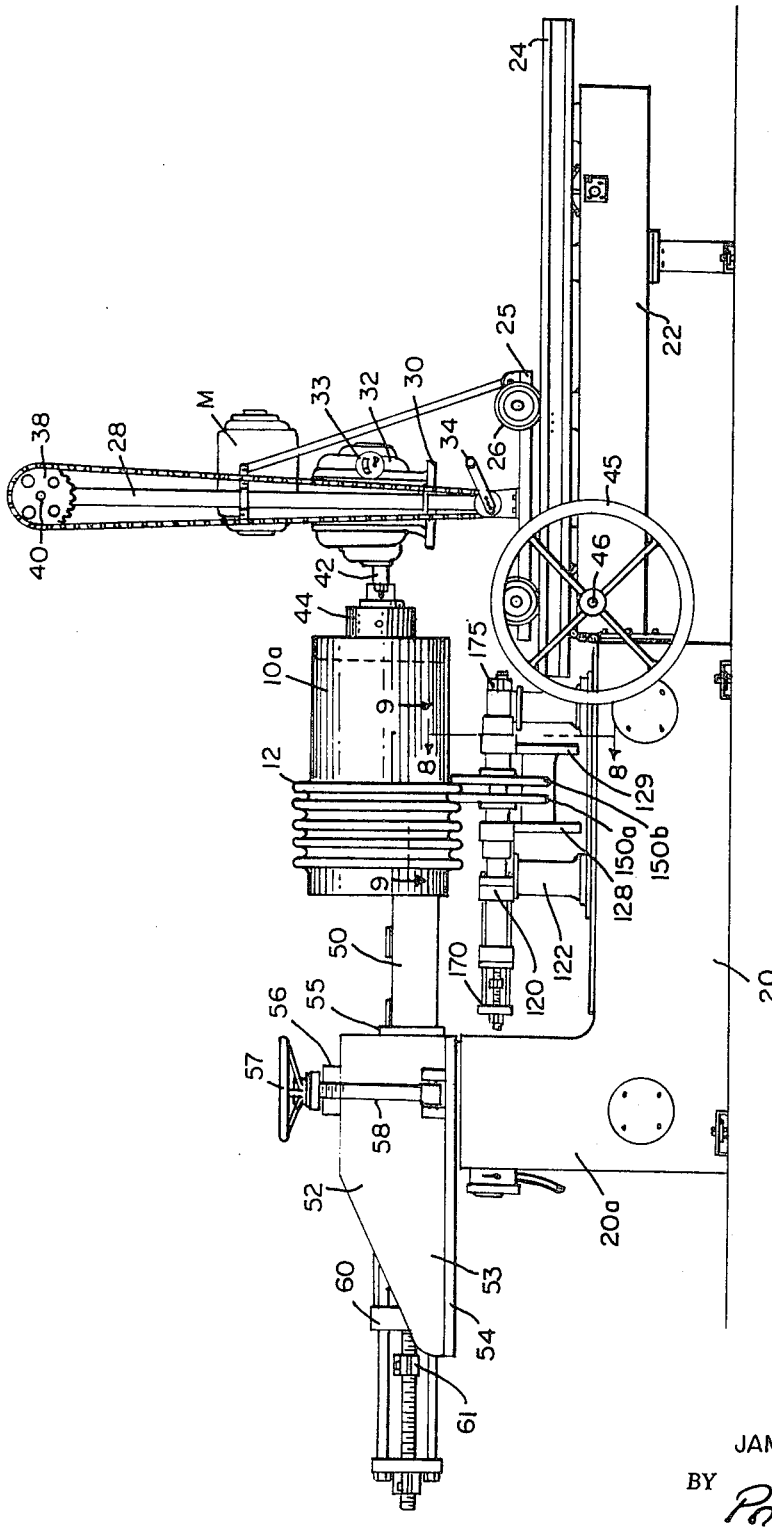
FIG. 3 is a side elevation of my apparatus.

Forming head 50 (FIGS. 3 and 4) is fixedly mounted on base 20 (at the left as shown in FIG. 3) on base pedestal 20a and includes head stock holder 52, which is a channel-shaped member, with side walls 53 and bottom plate 54. It will be understood that head stock holder 52 will receive and hold box 55 for all sizes of forming heads from 3 to approximately 30 inches in diameter, work pieces 10a, and can be used interchangeably therein on one machine. For diameter sizes from approximately 30 to 72 inches and larger, work pieces 10a, the base machine is the same, but it will be understood that the chuck and trolley end, the forming head, and internal and external forming rolls are correspondingly heavier and larger. To avoid frequent change-over and down time, and for volume production it is desirable to have two base machines, one for work-piece diameters from 3 to 30 inches, and a second for diameters from 30 to 72 inches, and larger. Mechanism is provided for holding various size forming head boxes 55 in the head stock holder 52 (one size for rolling heads for 3 to 30 inches, and a second size for rolling heads for 30 to 72 inches), which includes clamping nut 56, wheel 57 and hinged post 58.

Forming head 50 (FIG. 4) includes hydraulic cylinder and rod mechanism, generally indicated at 60, FIG. 3, which in turn includes stroke adjustment 61 and rod 62, FIG. 4, to which is connected twin draw bars 64 (FIGS. 4 and 6), in turn pivotally connected to twin rear bell crank levers 66, and to twin front bell crank levers 68, on pins 67 and 69, respectively. Rear lever 66 is fixedly pivoted on pin 70, in turn mounted on fixed rear bracket 72 and front bellcrank lever 68 is in turn fixedly pivoted on pin 74 and fixed front bracket 76. The front end of rear bell crank levers 66 is pivotally mounted on studs 78 of rear trunnion 80 (FIG. 7), through which extends in a sliding fit the reduced rear end 82a of round connecting rod 82, the front end of which in turn slides in front trunnion 84 (FIGS. 4 and 6). The front end of front bell crank lever 68 is pivotally mounted on studs 85 of front trunnion 84. Connecting rod 82 is guided for vertical movement only by means of a yoke 86, which engage straight side portions formed in rod 82, reinforced by collars 87. As shown, the mechanism thus described, is enclosed within the square box 90, preferably composed of detachable sections as shown in FIG. 4, made separate for ease of assembly and maintenance of the forming head. The dimensions of box 90 (width and height) are of course limited by the diameter of the workpiece 10a, which passes over the box as additional convolutions are formed, and the number of expansion joints made from one work-piece. It will be understood that the hydraulic system 60 is equipped with the usual oil reservoir, motor valves, pumps and piping and controls of a standard hydraulic system.

The rolling head 95 is fixedly and detachably mounted to face plates 96 (FIG. 5) on the front end of box 90 (FIG. 4) and houses internal forming roll 100, preferably of polished steel. Annular bronze bearings 102 encircle the rolling head 95, and are held in place by retaining rings 103 and 104, and provide a low-friction surface for the work piece 10a to rotate thereon, rolling head 95 being fixed. It will be understood that in larger diameters of work pieces 10a (8 inches and up) roller bearings may be substituted in place of bronze bearings. A slot 105 is provided in the bottom of the rolling head 95 to permit internal forming roll 100 to pass through the rolling head to engage the rotating work piece 10a and to form the convolutions therein. The leading end of rolling head 95 is open, to permit ready access to change rolls 100. The forming roll 100 is rotatably mounted on the stub end of connecting rod 82, with suitable roller bearings permitting free rotation of the forming roll 100 on the end of connecting rod 82, and with suitable spacers 106 and 107, to permit accurate location of the roll 100 in slot 105. A cap screw 108 is mounted on the free end of the stub end of the connecting rod, to hold the internal forming roll assembly in place. A work piece 10a is shown in dotted lines in position on the rolling head 95 with its first convolution 12 formed therein, and it will be understood that forming roll 100 is caused to move downwardly through slot 105, on the downward stroke of connecting rod 82, on the retraction stroke of rod 62 of the hydraulic cylinder of the hydraulic system 60, with the parts moving in the direction of the arrows shown thereon in FIG. 4. It will be understood that the convolutions 12 in the work piece 10a are formed by the engagement of freely rotating internal forming roll 100 with the positively driven work piece 10a on the downward stroke of the connecting rod 82, which forces internal roll 100 at great pressure against the two external forming rolls shown in FIGS. 5 and 9 described below.

The external roll assembly, shown generally at 120 (FIGS. 3, 8 and 9) is fixedly mounted on the bed or base 20 on posts 122, and each of which includes a plate 124 on which is mounted a journal box 125, which support a pivot shaft 126, on which are pivotally mounted two bell crank arms 128 and 129a, reinforced by two clamping nuts 127 which arms support the external forming rolls and their separate hydraulic system (FIGS. 8 and 9). Arm 128 is of one piece construction, and 129a is of two piece construction, having extension 129b. Arm 129 is made in two pieces A and B to facilitate assembly and changing of external forming rolls 150a and b, as desired. Hydraulic means 135 is provided for moving bell crank arms 128 and 129 on their pivot shaft 126, and consequently moving external forming rolls upwardly and downwardly toward and away from work piece 10a, to provide force and pressure on external rolls 150a and b, to form the desired convolutions 12 in work piece 10a. Thus both internal forming roll 100 and external forming rolls 150a and b are moved toward each other under great force and pressure to form the desired convolutions in work piece 10a. Reinforcing tubes 130 are provided for stiffening arms 128 and 129. Hydraulic means 135 (FIG. 8) includes the standard cylinder, and rod 136 which is connected to boss 138, and rod 140 connecting the bell crank arms 128 and 129 at their bottom ends. It is understood that the usual conventional oil reservoir, motor valves, pumps and controls are provided, not shown in the drawings.

The external forming rolls 150a and b are carried on the ends of arms 128 and 129b (FIG. 9) on a tubular hub 152, and are independently freely rotatable therewith. Roll 150a is rotatable on bushing 154, independent of roll 150b. Roll 150a is prevented from moving to the left by thrust bearing 155 bearing against arm 128, and is prevented from moving to the right by compression spring 156. Arm 128 is reinforced by clamping collar 157 which is mounted on bushing 158. Roll 150b is fixed to hub 160, which is free to rotate on bushing 162. Arm 129a is reinforced with clamping collar 164, which is mounted on bushing 166. Hydraulic means generally indicated at 170 (FIG. 9) is provided for adjusting the relative spacing between rolls 150a and b, roll 150a being fixed longitudinally to provide external support of work piece 10a against the thrust of internal roll 100, and moving roll 150b laterally toward roll 150a. This hydraulic means 170 includes hydraulic cylinder 172, rod 174, the free end of which is threaded, and carries locking nut 175 thereon. Locking nut is abutted by thrust bearing 176, which bears in turn against flanged bushing 178 in turn rigidly fixed to hub 160. It will be understood that in operation, retraction of rod 174 into cylinder 172 will carry with it nut 175, bushing 178 and hub 160, and hence move roller 150b toward roller 150a, to provide opposing force against work piece 10a, and internal roll 100. This movement is against the force of spring 156, which is compressed, and when rod 175 is released by cylinder 172, spring 156 moves roll 150b laterally away from roll 150a, to permit the work piece to be indexed on the forming head, and to permit the next convolution to be formed. The two external forming rolls 150a and b are preferably separate and spaced apart to permit adjustability as to contour, width and height of convolutions. But it is to be understood that in certain situations and conditions, particularly with shallow convolutions, a single grooved roll, or a single multiple grooved roll may be used in place of the two external rolls 150a and b. In that situation, of course, hydraulic means 170 is unnecessary.

In addition to forming metal bellows expansion joints, it is apparent this same apparatus may be used for forming reinforcing grooves or ridges in cylindrical and tubular metal pieces, such as ducting, conduits, piping, drains, barrels and bands without departing from this invention.

In operation, it will be understood that a work piece 10a is first immersed in a suitable deep draw lubricant, and then clamped on chuck 44, and loosely placed over rolling head 95. Internal roll 100 and external rolls 150a and b, and forming head 50 have been selected of a size suitable to form convolutions in a work piece of the particular diameter, material, and form and contour of convolutions desired. Controls are then adjusted for the hydraulic systems 60 for internal roll 50, and 135 for the external rolls 150a and b for the pressures desired, and motor M is started. The rolling of the first convolution between internal roll 50, and external rolls 150a and b then takes place, and when the first convolution is formed, the internal and external rolls are separated, and the work piece 10a indexed on trolley 25. The second convolution is then formed and so on, until the desired number of convolutions are formed. While trolley 25 is shown here for manual indexing of the work piece 10a, it is understood that this operation can be readily automated, indexing trolley 25 automatically after the necessary number of revolutions are made to form one convolution.

As a separate operation, mechanism is provided for work-hardening the inner convolutions 11 of the work piece 10a, to provide uniform hardness of the convolutions—usually to the same yield point between the inner and outer convolutions 11 and 12. It will be understood that in forming the outer convolutions in the previous operation just described, only the outer convolution 12 is work-hardened by the forming rolls. It thus has a higher yield point than the inner convolution 11, which is untouched in the first drawing or rolling operation. To provide uniformity throughout the expansion joint, and not leave a weakened spot, it is desirable to work-harden the inner convolution, and this is done in the separate operation now described.

This mechanism (FIG. 10) comprises frame 200 which is stationed on the floor, and levelled by leveling screws 201. A motor M2 is mounted in the frame 200, with speed reducer SR2, around the shaft 203 of which V-belt 204 passes to a sheave 205, which in turn drives shaft 206 on which it is mounted. A gear 207 mounted on shaft 206 drives gear 208 to turn shaft 210. Shaft 206 ends with quick-connecting tapered chuck 212 to which spindle 214 is attached, and which is demountable to carry different sized rolls. On the outer end of spindle 214, two fixedly spaced internal rolls 215 are fixedly mounted, spaced to fit the convolutions on the work piece 10a. The rolls 215 constitute a forming head to receive the work piece 10a on which inner and outer convolutions 11 and 12 have been formed. It will be noted in FIG. 10, that outer convolutions 12 rest on the internal rolls 215, and that external roll 226, described below, is moved downwardly under great pressure, against the inner convolution 11, stretching the metal at the sides, and compressing it at the bottom of the convolution, thus drawing and work-hardening the inner convolution 11. The necessary number of revolutions of the rolls for work-hardening the inner convolution to an approximate yield point can be readily determined by standard hardness tests which give a relative yield point in pounds per square inch (approximately 70,000 p.s.i. for No. 321 stainless steel, which doubles the normal yield point of a standard annealed and pickled 321 stainless steel sheet). Such controlled work-hardening is impossible on hydraulically formed metal bellows—which require metal reinforcing rings when internal working pressures exceed approximately 75 p.s.i., in standard applications.

A second shaft 210 (FIG. 10) is secured by a universal joint 220 to shaft 221 and a universal joint 222, to quick-disconnecting shaft 224, on which external roll 226 is fixedly mounted. It is understood that suitable spacers 228 are provided for replacing rolls of varying size, and that shaft 224 is readily disconnected by unscrewing nut 230, which releases rod 232 for readily dismounting the external roll 226, when desired. To adjust the external roll 226 to fit varying diameters of work-pieces 10a, shaft 224 and external roll 226 are mounted on a vertically movable frame 234 slidable in housing 236, on the lower end of rod 238. Rod 238 is movable downwardly by means of a hydraulic system, shown generally at 240, which includes the cylinder 242, rod 244, link 245, and twin bell crank lever 246 to a pin 247 on rod 238. It will be understood that the usual components of a hydraulic system of tank motor, pump, valves, piping and controls are provided.

In operation, it will be seen that inner rolls 215 which carry the work-piece 10a are positively driven, external roll 226 is positively driven, and that these rolls are rotated at approximately the same peripheral linear speed, in opposite directions and thus carry and rotate the work piece 10a between them. Controls for the hydraulic system 240 are set to provide suitable pressure on the inner convolutions 11 of work-piece 10a for proper work-hardening, and thus hydraulic system 240 and its connecting linkage force external roll 226 into the inner convolution 11 of the work-piece 10a against the pair of internal rolls 215, to stretch and further compress the inner convolution 11 and thus work-harden the same. The operation is repeated, of course, for each successive inner convolution. Again, the work-hardening operation may be automated, if desired, on determining the proper pressure in the hydraulic system 240 and the proper number of revolutions of external roll 226 to achieve the necessary degree of work-hardening of the inner convolutions is determined.

The separate work-hardening operation on the inner convolutions of the metal bellows is important, because for the first time, the convolutions of the expansion joints are so formed and contoured that for all practical purposes stresses are constant throughout the whole convoluted element. As shown in FIG. 2 above, every convolution in the same element has the same wall thickness, the same height of convolution, the same effective area, and when given the same degree of hardness by the work-hardening operation on the inner convolutions, each convolution in the installed expansion joint moves the same distance as all other convolutions within remarkably close limits. Expansion joints thus made are inherently self-equalizing, and do not require equalizing mechanisms, such as reinforcing rings. They require only limit stops to prevent over-loading of individual joints or accidental crushing. Thus all movements are within the elastic limits or yield point of the metal from which the expansion joint is made. Thus no longer is the expansion joint the weak spot in the pressure line.

It will be understood that a rotary shear may be added to this mechanism, if desired, for trimming and shearing the ends of the finished work-piece 10a, and thus complete the manufacturing operation.

By means of my novel and unique method and apparatus greater rolling pressures are made available for the first time, for forming metal bellows expansion joints of heavier gauge than heretofore possible, and for forming on the same machine a great range of expansion joints, ranging from 3 to 72 inches in diameter, and higher, the height of convolutions can be varied within limits by adjusting the pressures on the internal and external forming rolls and the number of convolutions in an expansion joint is limited, not by the dies in stock, but only by the length of the work-piece. All this is done at greater speed, and greatly lower cost of manufacture, and with the yield point of the convolutions carefully controlled and made uniform throughout the expansion joint.

Figure 10:
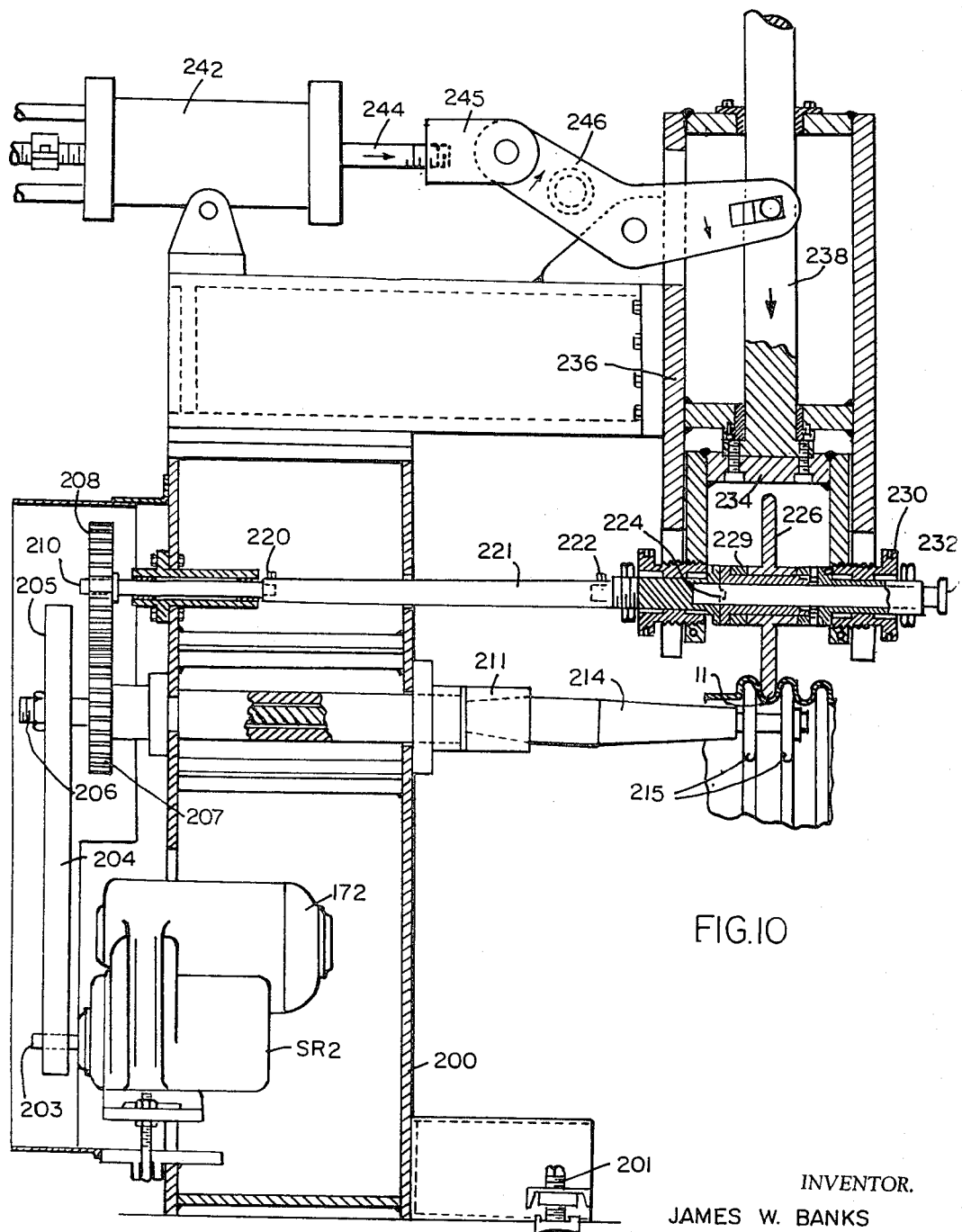
FIG. 10 is a front elevation partly in vertical section of a separate set of forming rolls for work-hardening the inner convolutions of the expansion joint.

It is understood that if it is desired additionally to work-harden the outer convolutions of the work-piece 10a to meet a customer's specifications, the rolls 215 and 226 need merely be reversed, in FIG. 10.

I claim:

1. The method of forming cylindrical metal bellows expansion joints having successive peripheral convolutions therein, which comprises the steps of:
    fixedly mounting a cylindrical work-piece on a rotatable chuck,
    positively driving the rotatable chuck,
    transversely moving a freely rotatable internal forming roll mounted in a fixed forming head against the interior side of said cylindrical work-piece, and against a pair of opposing, fixedly mounted, and freely rotatable external forming rolls, said internal and external forming rolls having their axes parallel to the axis of the work-piece to form a peripheral convolution on said work-piece, and moving said chuck longitudinally of said external forming rolls to form successive peripheral convolutions on said work-piece.

2. The method of claim 1, wherein said cylindrical work piece, after the successive convolutions are formed therein, is additionally rotated between a separate pair of positively driven, opposed, forming rolls rotating in opposite directions, to work-harden the convolutions formed in said work-piece.

3. The method of forming cylindrical metal bellows expansion joints having successive peripheral convolutions therein, which comprises:
    fixedly counting a cylindrical work-piece on a rotatable work-holder,
    positively driving the rotatable work-holder,
    loosely carrying the open end of said cylindrical work piece on a fixed forming roll head,
    tightly gripping the rotating cylindrical work-piece between a freely rotatable internal forming roll mounted in the fixed forming roll head engaging work-pieces on the inside, and a pair of opposing, freely rotatable, complementary external forming rolls engaging the work-piece on the outside, said internal and external forming rolls having their axes parallel to the axis of the work-piece, positively moving said opposing rolls toward each other and applying pressure thereto to form a peripheral convolution on said work-piece, and advancing said work-holder and work-piece thereon longitudinally of said fixed forming roll head to form successive peripheral convolutions on said work-piece.

4. The method of claim 3, wherein said cylindrical work-piece, after the successive convolutions are formed therein, is additionally rotated between a separate pair of positively driven, opposed, forming rolls rotating in opposite directions, to work-harden the inner convolutions formed in said work-piece.

5. Apparatus for forming cylindrical metal bellows expansion joints having successive peripheral convolutions therein, which comprises:
   a bed,
   a rotatable chuck on which a cylindrical work-piece is fixedly mounted,
   means for positively driving the rotatable chuck,
   a forming head fixedly mounted on said bed,
   a freely rotatable internal forming roll mounted for transverse movement within said forming head, a pair of spaced, complementary, freely rotatable external forming rolls fixedly mounted on said bed,
   said internal and external forming rolls having their axes parallel to the axis of the work-piece,
   power means for moving the internal forming roll transversely against the interior side of said cylindrical work-piece, and against said exterior forming rolls,
   and thereby forming a peripheral convolution in said cylindrical work-piece,
   and means for moving said chuck longitudinally on said bed and toward said forming head for forming successive convolutions on said work-piece.

6. Apparatus for forming cylindrical metal bellows expansion joints having successive peripheral convolutions therein, which comprises:
   a bed,
   a rotatable chuck on which a cylindrical work-piece is fixedly mounted,
   means for positively driving the rotatable chuck,
   a forming roll head fixedly mounted on said bed,
   said cylindrical work-piece fitting loosely on said forming roll head,
   a freely rotatable internal forming roll mounted for transverse movement within said forming roll head,
   a pair of laterally spaced complementary external forming rolls freely rotatable on a shaft fixedly mounted on said bed, said internal and external forming rolls having their axes parallel to the axis of the work-piece,
   power means for moving the internal forming roll transversely against the interior side of said cylindrical work-piece, and against said exterior forming rolls,
   power means for moving said exterior forming rolls transversely against the exterior side of said cylindrical work-piece and against said interior forming roll, and thereby forming a peripheral convolution in said cylindrical work-piece,
   and means for moving said work-piece longitudinally on said forming roll head for forming successive convolutions on said work-piece.

7. Apparatus as in claim 6, in which said pair of spaced, external forming rolls freely rotatable on a shaft fixedly mounted on said bed, includes first and second rolls in which said first roll is fixed laterally on said shaft, and the second roll is movable laterally toward said first roll, and power means for moving said second roll laterally toward said first roll.

8. Apparatus as in claim 6, in which said power means for moving said internal forming roll and said external forming rolls transversely against each other and against the side of the work-piece held between them, is hydraulic.

9. Apparatus for forming cylindrical metal bellows expansion joints having successive peripheral convolutions therein, which comprises:
   a bed,
   a rotatable work-holder on which a cylindrical work-piece is fixedly mounted,
   power means for positively driving the rotatable work-holder,
   a forming roll head fixedly mounted on said bed, said cylindrical work piece fitting loosely over said forming roll head,
   a freely rotatable internal forming roll mounted for transverse movement within said forming roll head,
   a pair of opposing, laterally spaced, external forming rolls freely rotatable on a shaft fixedly mounted on said bed, said internal and external forming rolls having their axes parallel to the axis of the work-piece,
   hydraulic means for moving the internal forming roll transversely against the interior side of said cylindrical work-piece,
   hydraulic means for moving the external forming rolls transversely against the exterior side of said cylindrical work-piece,
   said internal and external forming rolls being rotated by the positively driven cylindrical workpiece held between them,
   thereby to form a peripheral convolution in said cylindrical work-piece,
   and means for moving the cylindrical work-piece fixedly held on said work-holder longitudinally on said forming roll head for forming successive convolutions on said work-piece.

10. Apparatus as in claim 9 in which said pair of opposing, laterally spaced, external forming rolls freely rotatable on a shaft fixedly mounted on said bed, includes first and second rolls, in which said first roll is fixed laterally on said shaft, and the second roll is movable laterally toward said first roll, and hydraulic means for moving said second roll laterally on said shaft toward said first roll.

References Cited

UNITED STATES PATENTS

| | | | |
|---|---|---|---|
| 432,232 | 7/1890 | Fife | 72—100 |
| 971,838 | 10/1910 | Fulton | 113—116 |
| 1,270,402 | 6/1918 | Fulton | 113—116 |
| 1,854,944 | 4/1932 | Lee et al. | |
| 3,143,794 | 8/1964 | Martin-Hurst | 113—116 |
| 3,269,005 | 8/1966 | Smith et al. | 219—62 |

RICHARD J. HERBST, *Primary Examiner.*

U.S. Cl. X.R.

113—116